United States Patent
Malone

(10) Patent No.: US 6,216,555 B1
(45) Date of Patent: Apr. 17, 2001

(54) SERVICEABLE CORE ADJUST

(75) Inventor: David Malone, Attica, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 551 days.

(21) Appl. No.: 08/889,872

(22) Filed: Jul. 8, 1997

Related U.S. Application Data

(63) Continuation-in-part of application No. 08/655,391, filed on May 30, 1996, now abandoned.

(51) Int. Cl.[7] ..................................................... F16C 1/10
(52) U.S. Cl. ........................................ 74/502.6; 74/502.4
(58) Field of Search ............................... 74/502.4, 502.6, 74/500.5, 501.5 R

(56) References Cited

U.S. PATENT DOCUMENTS

| | | |
|---|---|---|
| 5,161,428 | 11/1992 | Petruccello . |
| 5,295,408 | 3/1994 | Nagle et al. . |
| 5,435,202 | 7/1995 | Kitamura . |
| 5,477,745 | 12/1995 | Boike et al. . |
| 5,531,134 | 7/1996 | Petruccello . |
| 5,571,237 * | 11/1996 | Lu et al. .............................. 74/502.4 |
| 5,588,334 * | 12/1996 | Lu et al. .............................. 74/502.6 |
| 5,590,567 * | 1/1997 | Marrs et al. ......................... 74/502.4 |
| 5,596,908 | 1/1997 | Hall . |
| 5,598,743 | 2/1997 | Yasuda . |
| 5,605,074 | 2/1997 | Hall et al. . |

FOREIGN PATENT DOCUMENTS

| | | | |
|---|---|---|---|
| 2708683 * | 2/1995 | (FR) ................................... 74/502.4 |
| 6-147215 * | 5/1994 | (JP) .................................... 74/502.4 |

* cited by examiner

Primary Examiner—Vinh T. Luong
(74) Attorney, Agent, or Firm—Howard & Howard

(57) ABSTRACT

A motion transmitting remote control assembly for transmitting motion in a curved path comprising a flexible motion transmitting core element (12) movably supported by a conduit (14). An adjustment mechanism is disposed on the end of the core element (12) for adjusting the length of the core element (12) and includes a slider member (18) attached to one end of the core element (12) and presenting slider teeth (20) on the exterior thereof and a housing (22, 122) slidably supporting the slider member (18) for movement along the longitudinal axis and adapted for connection to a control member (25). The housing (22, 122) has a bottom (26) and an opening extending upwardly from the bottom (26) and surrounded by sides (28) parallel to the longitudinal axis and first (30) and second (32) ends extending transverse to the longitudinal axis and a locking button (34, 134) is supported in the opening in the housing (22, 122) for moving between an unlocked position (FIG. 6) in which the slider member (18) may slide freely relative to the housing (22, 122) and a locked position (FIG. 1) in which the slider member (18) is prevented from sliding relative to the housing (22, 122). The locking button (34, 134) is U-shaped and presents button teeth (36) on the interior thereof for engaging the slider teeth (20) in the locked position. The assembly is characterized by the locking button (34, 134) including release tabs (38, 40) engaging the first and second ends (30, 32) of the opening in the housing (22, 122) for retaining the locking button (34, 134) in the locked position in the housing (22, 122) and for releasing the locking button (34, 134) from the locked position in the housing (22, 122) in response to forces applied thereto in a direction parallel to the longitudinal axis.

20 Claims, 5 Drawing Sheets

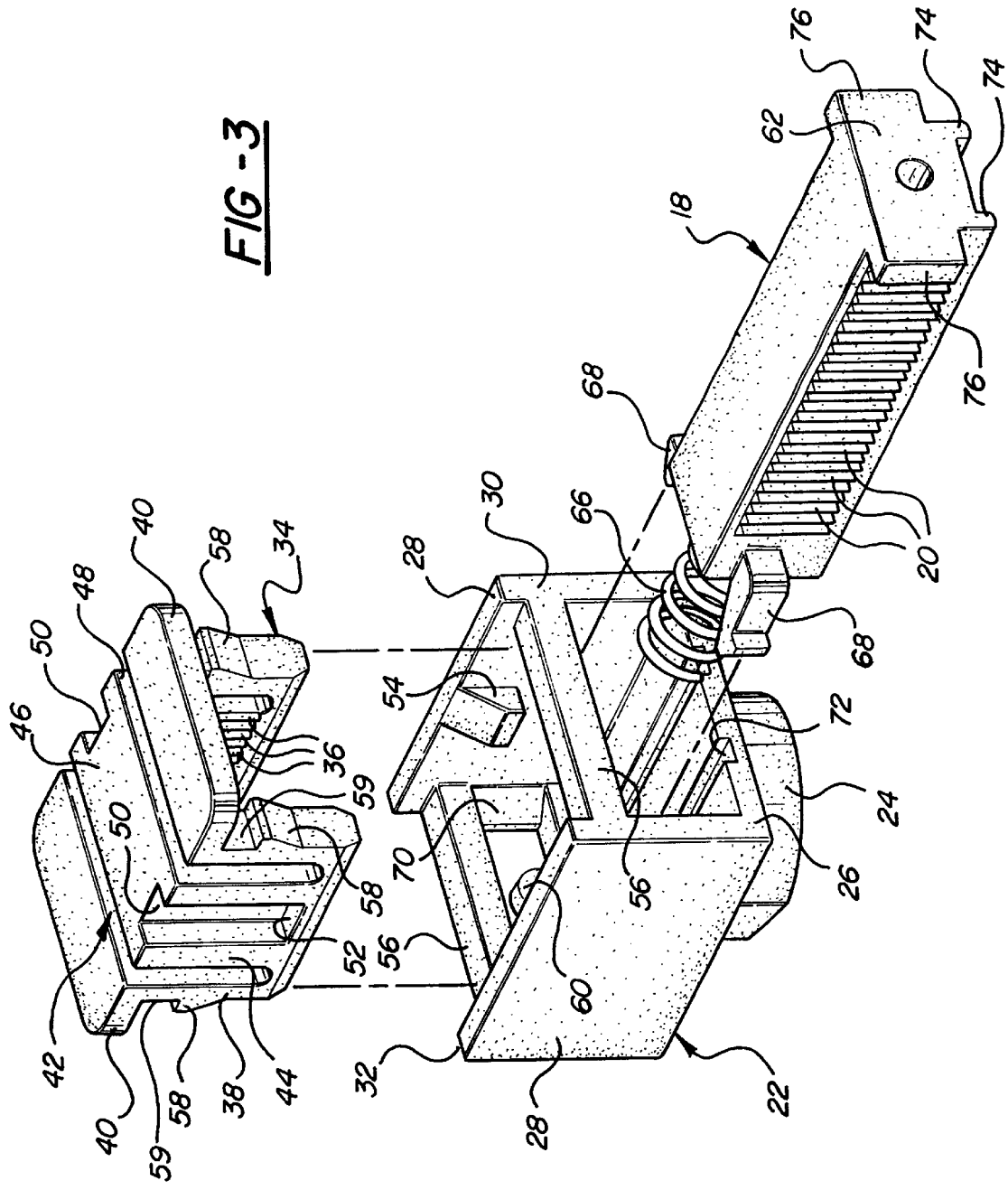

SERVICEABLE CORE ADJUST

RELATED APPLICATION

This application is a continuation-in-part of application Ser. No. 08/655,391 filed May 30, 1996, now abandoned.

BACKGROUND OF THE INVENTION

1. Field of the Invention

The subject invention relates to a motion transmitting remote control assembly of the type for transmitting motion in a curved path by a flexible motion transmitting core element which has an adjustment mechanism on the end of the core element to adjust the length of the core element, More specifically, the invention relates to an improvement in the configuration of the adjustment mechanism.

2. Description of the Prior Art

Adjustment mechanisms for adjusting the length of the core element during installation of the control assembly are well known. However, the subject invention was made against the background of the assemblies shown in U.S. Pat. Nos. 5,295,408 and 5,447,745, the latter of which is assigned to the assignee of the subject invention. Such assemblies are installed in automotive vehicles to control various devices by manual input from the vehicle operator. During installation, the overall length of the control assembly is adjusted. However, it frequently occurs that the length of the control assembly must be adjusted during service of the vehicle. There is, therefore, a constant requirement for a core adjust assembly which is easily manually removed from the locked position for readjustment during service.

SUMMARY OF THE INVENTION AND ADVANTAGES

A motion transmitting remote control assembly for transmitting motion in a curved path comprising a flexible motion transmitting core element movably supported by a conduit and a slider member attached to one end of the core element and presenting slider teeth on the exterior thereof. A housing slidably supports the slider member for movement along the longitudinal axis and is adapted for connection to a control member. The housing has a bottom and an opening extending upwardly from the bottom and surrounded by sides presenting interior surfaces and parallel to the longitudinal axis and first and second ends extending transverse to the longitudinal axis. A locking button is supported by the housing for moving between an unlocked position in which the slider member may slide freely relative to the housing and a locked position in which the slider member is prevented from sliding relative to the housing, the locking button being U-shaped to define legs presenting button teeth on the insides of the legs for engaging the slider teeth in the locked position. The assembly characterized by the locking button including release tabs engaging the first and second ends of the opening in the housing for retaining the locking button in the locked position in the housing and for releasing the locking button from the locked position in the housing in response to forces applied thereto in a direction parallel to the longitudinal axis.

Accordingly, the subject invention provides an improved core adjust mechanism in which the locking button may be easily manually grasped and released from the locked position for service and thereafter re-locked. Most importantly, the novel mechanism requires a compact space because the release tabs are longitudinally aligned rather than taking up valuable space on the sides of the adjusting mechanism. The placement of the locking tabs on the ends also allows the retention detent to be placed on the sides of the mechanism, resulting in a more sturdy retention detent.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an exploded perspective view of the adjustment mechanism from the opposite end;

FIG. 4 is a bottom view of the housing showing the connector for connection of the core element to a member to be controlled;

FIG. 5 is an end view of the housing taken substantially along line 5—5 of FIG. 4.

DETAILED DESCRIPTION OF THE PREFERRED EMBODIMENT

Figure 1:
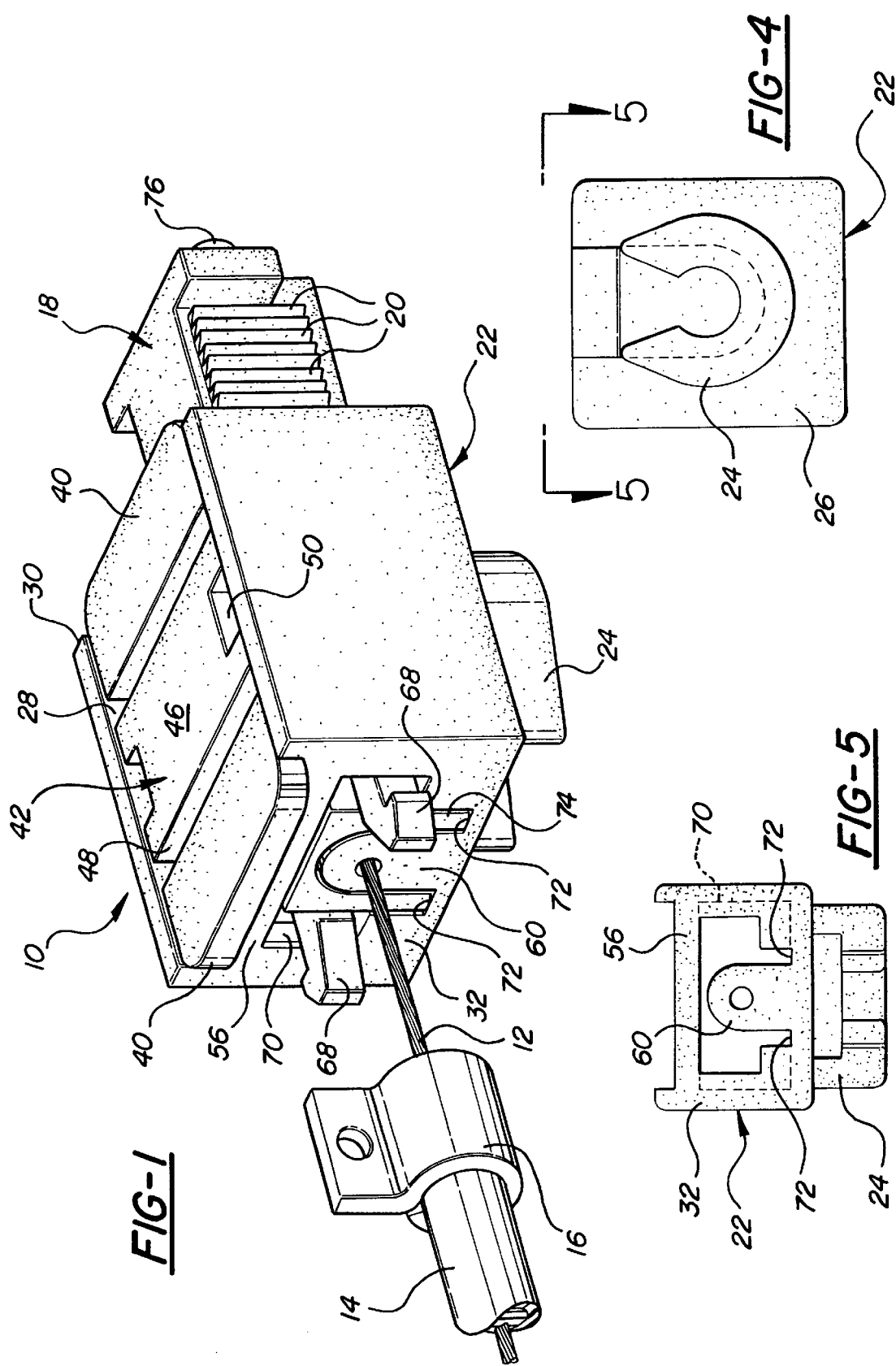
FIG. 1 is a perspective view showing the adjustment mechanism in the locked position.
Figure 2:
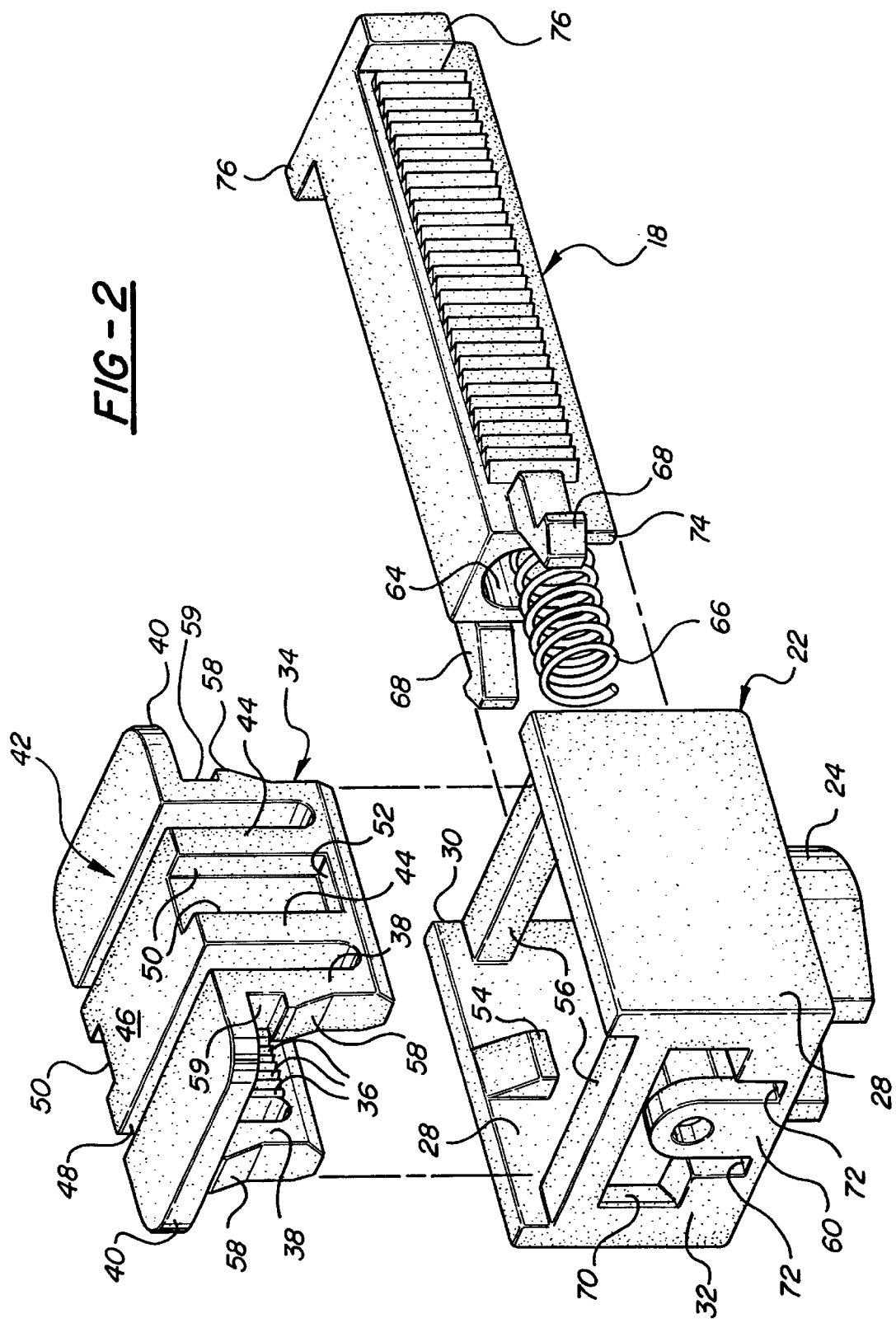
FIG. 2 is an exploded perspective view of the adjustment mechanism from the same perspective as FIG. 1.
Figure 6:
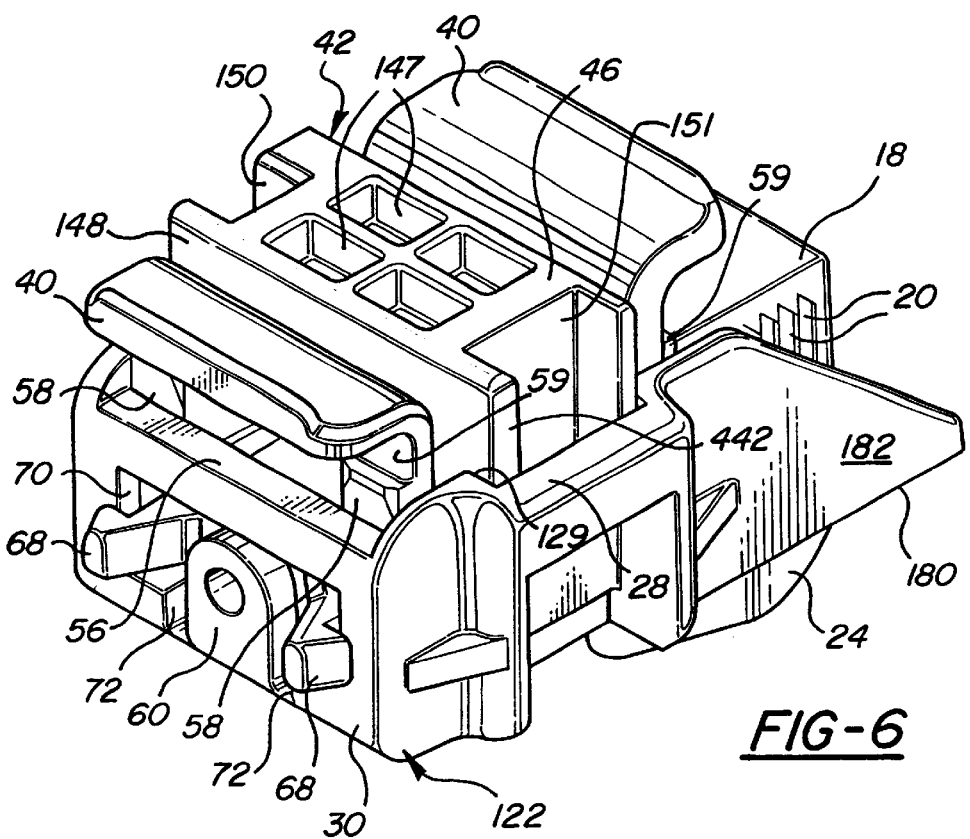
FIG. 6 is a perspective view of a second embodiment, but showing the adjustment mechanism in the unlocked position.
Figure 8:
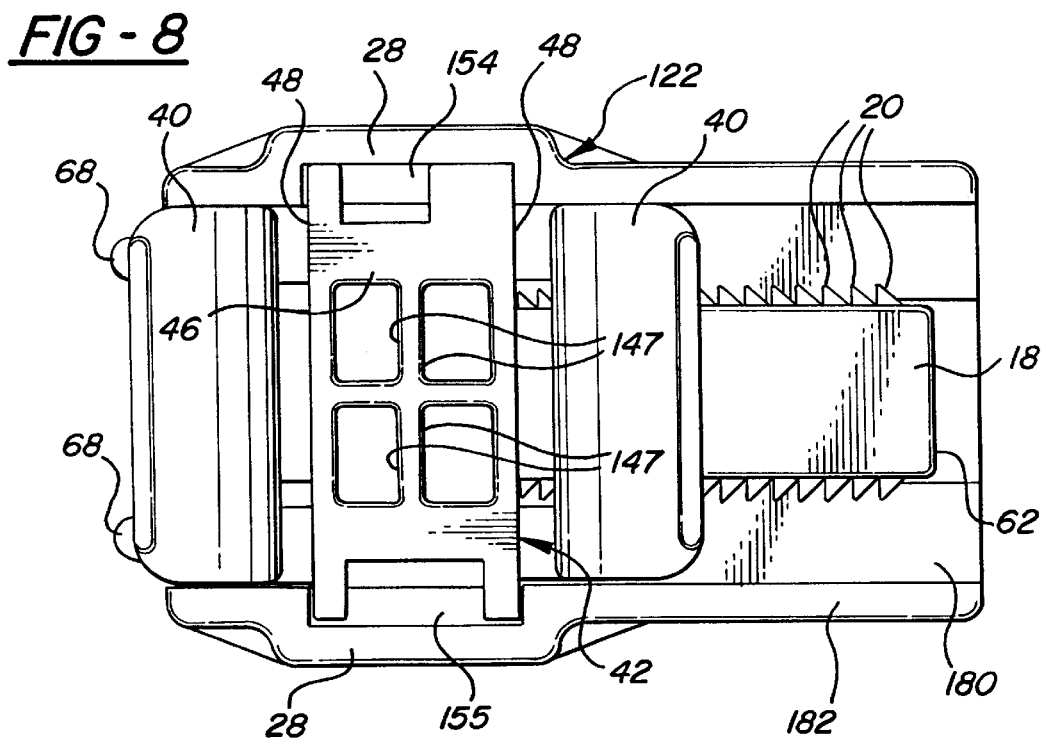
FIG. 8 is a top view of the embodiment of FIG. 6.
Figure 7:
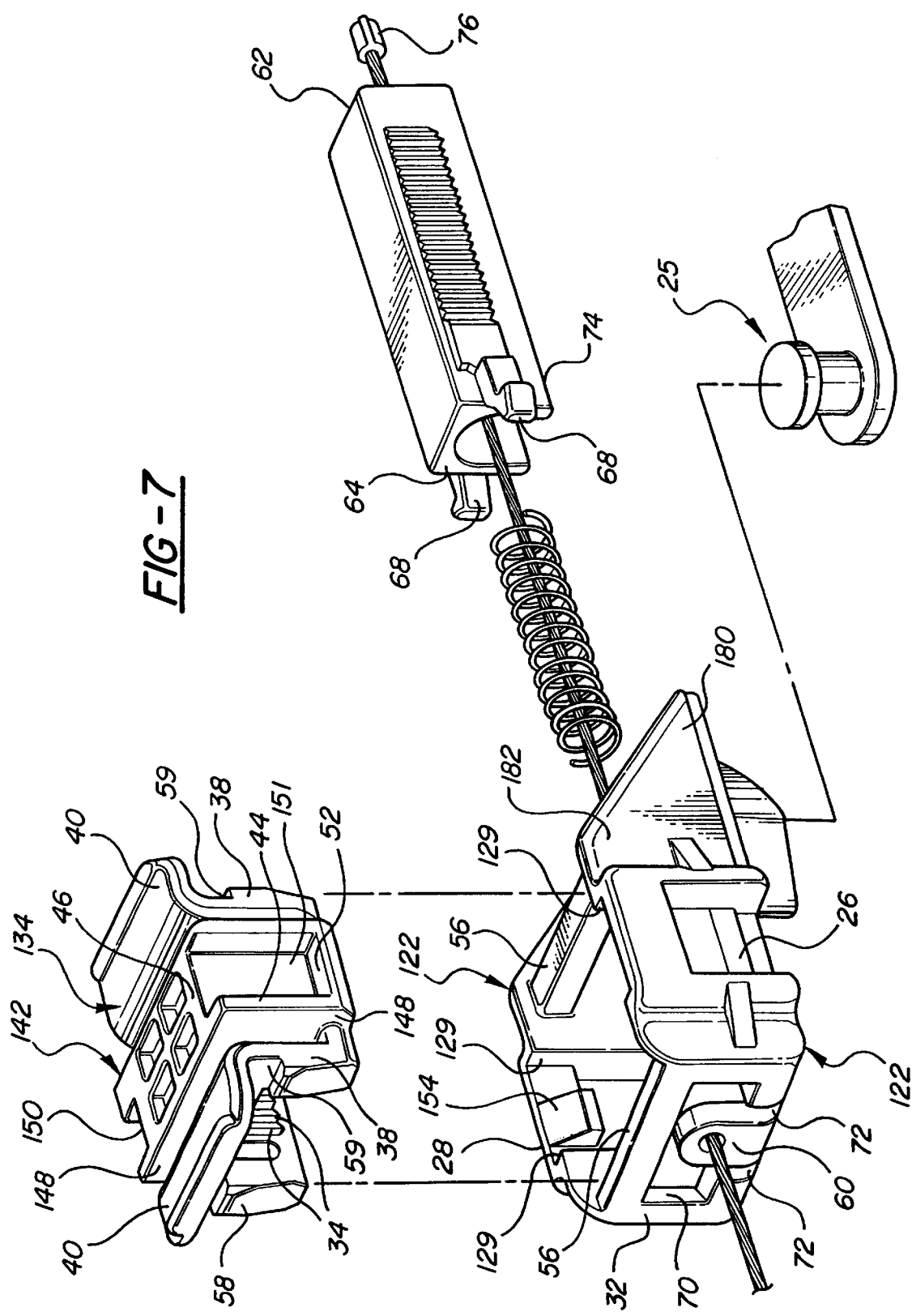
FIG. 7 is an exploded perspective view of the embodiment shown in FIG. 6.

Referring to the Figures, like numerals reference like or corresponding parts throughout the several views, including the alternate embodiment shown in FIGS. 6 through 8, except variations of corresponding elements and additional elements are numbered with the same number but increased by 100. A motion transmitting remote control assembly for transmitting motion in a curved path is generally shown at 10 in FIG. 1. The assembly 10 comprises a flexible motion transmitting core element 12 and a conduit 14 movably supporting the core element 12. A fitting 16 is molded about the end of the conduit 14 for attaching the conduit 14 to a support structure, i.e., the vehicle body.

A slider member, generally indicated at 18, is attached to one end of the core element 12 and presents slider teeth 20 on the exterior thereof.

A housing, generally indicated at 22 in FIGS. 1 through 5 and at 122 in FIGS. 6 through 8, slidably supports the slider member 18 for movement along the longitudinal axis and is adapted for connection to a control member, not shown. More specifically, the housing 22, 122 includes a connection 24 for connecting the housing to a control member 25, as shown in FIG. 7, the connection being a "C" shaped clip disposed on the bottom side 26 of the housing 22, 122. The housing 22, 122 has the bottom 26 and an opening extending upwardly from the bottom 26 and surrounded by sides 28 presenting interior surfaces and parallel to the longitudinal axis and first 30 and second 32 ends extending transverse to the longitudinal axis.

A locking button, generally indicated at 34 in the first embodiment and at 134 in the second embodiment, is supported by the housing 22, 122 for moving between an unlocked position (FIG. 6) in which the slider member 18 may slide freely relative to the housing 22, 122 and a locked position (FIG. 1) in which the slider member 18 is prevented from sliding relative to the housing 22, 122. The locking button 34, 134 is U-shaped to define legs presenting button teeth 36 on the insides of the legs for engaging the slider teeth 20 in the locked position.

The assembly is characterized by the locking button 34, 134 including release tabs, each comprising a leg 38 and a shelf 40, engaging the first and second ends 30 and 32 of the opening in the housing 22 for retaining the locking button 34, 134 in the locked position in the housing 22, 122 and for releasing the locking button 34, 134 from the locked position in the housing 22, 122 in response to forces applied thereto in a direction parallel to the longitudinal axis. The importance of the release tabs 38, 40 being on the longitudinal ends is that the mechanism is more compact laterally yet is very accessible and sturdy, i.e., the mechanism remains narrow.

The locking button 34, 134 includes a central body, generally indicated at 42, having lateral surfaces 44 for engaging the interior of the sides 28 of the housing 22, 122 and a top 46 extending between the lateral surfaces 44. The central body 42 has U-shaped end surfaces 48 and 148 extending transversely to the longitudinal axis and intersecting the lateral surfaces 44 and the top 46. The top 46 in the embodiment of FIGS. 6 through 8 includes four cavities 147 to prevent warpage during cooling or curing of the plastic molded part. A channel 50, 150, 151 is disposed in each of the lateral surfaces 44 extending from the top 46 downwardly to a step 52. Catches 54, 154, 155 are disposed on the interior of the sides 28 of the housing 22, 122 for preventing the locking button 34, 134 from being removed from the housing 22, 122 in the unlocked position, Each of the catches 54, 154, 155 includes a wedge surface for riding over the step 52 and into the channel 50, 150, 151 in the adjacent lateral surface 44 for retaining the locking button 34, 134 to the housing 22, 122 during movement between the locked and unlocked positions. In other words, during shipping, the locking button 34, 134 will be connected to the housing 22, 122 as the abutment of the catches 54, 154, 155 will be retained in the channels 50, 150, 151.

In the embodiment of FIGS. 6 through 8, the channels 150, 151 are of different widths longitudinally and the coacting catches 154, 155 are also of the same different widths. Accordingly, the channel 150 is of the same width and paired with the catch 154, and the channel 151 is of the same width and paired with the catch 155. Therefore, the locking button 134 is allowed only one way insertion into the housing 122. In other words, the asymmetrical arrangement of the channels 150, 151 and catches 154, 155 prevents the button from being inserted backwards.

The first and second ends 30, 32 each include a cross beam or tongue 56 extending between the sides 28 of the housing 22, 122 in spaced relationship to the bottom 26 to define an opening for receiving the slider member 18. Each cross beam 56 defines a tongue, and a ramp 58 is disposed on each tab leg 38 in spaced relationship to the shelf 40 to define a groove 59 therebetween and for ramping over each of the cross beams 56 whereby each of the cross beams 56 is disposed in one of the grooves 59 in the locked position. Accordingly, the assembly includes a tongue 56 and groove 59 for mechanically interlocking each of the tabs 38, 40 and the housing 22, 122 in the locked position, with each tongue 56 and groove 59 extending transversely to the longitudinal axis.

Each of the tab legs 38 is spaced from the adjacent end surface 48, 148 of central body 42 and is connected to the central body 42 at the lower ends thereof. Each shelf 40 interconnects the upper ends of the tab legs 38 and the shelves 40 extend longitudinally in opposite directions away from the central body 42. The shelves 40 extend longitudinally over the cross beams 56 in the locked position whereby the shelves 40 may be manually grasped and forced together toward the end surfaces 48 to clear the ramps 58 from the cross beams 56 to remove the locking button 34, 134 from the locked position to the unlocked position.

A spring abutment 60 is disposed in the opening at the second end 32. The slider member 18 includes a passage extending between a closed end 62 and an open end 64, the spring abutment 60 being disposed in the passage for sliding movement of the slider member 18 over the spring abutment 60. A spring 66 is disposed in the passage and reacts between spring abutment 60 being disposed in the passage for sliding movement of the slider member 18 over the spring abutment 60. A spring 66 is disposed in the passage and reacts between the closed end 62 and the spring abutment 60 to urge the slider member 18 out of the first end 30 of the housing 22, 122.

A pair of hooks 68 are disposed on the opposite sides of the slider member 18 and extend through the opening in the second end 32 to hook onto the second end 32 to prevent the slider member 18 from moving out of the housing 22, 122 in a shipping condition. The hooks 68 are also disposed under the locking button 34, 134 in the shipping condition to prevent the locking button 34, 134 from being moved down and into the locked position until the slider member 18 is manually moved form the shipping position against the force of the spring 66 to move the hooks 68 out of the housing 22, 122.

A pair of latches 70 are disposed at opposite sides of the opening in the second end 32 for forcing the hooks 68 together as the slider member 18 is initially coupled with the housing 22, 122 and the hooks 68 snap over the latches 70 and into mechanical interlocking engagement therewith.

The shelves 40 and the top 46 of the locking button 34, 134 are in the same plane in the locked position. This is possible because the cross beams 56 are below the upper extremities of the sides 28 are also in the same plane with the shelves 40 and the top 46 in the locked position .

The bottom 26 has guides 72 extending longitudinally from the first end 30 to the second end 32 and the slider member 18 includes longitudinally extending rails 74 disposed in the guides 72. The slider member 18 of the first embodiment also includes retaining flanges 76 for retaining the slider member 18 within the housing 22 by preventing the slider member from exiting the opening surrounding the abutment 60.

The core element 12 extends through a hole in the spring abutment 60 and through the passage of the slider member 18 and through a hole in the closed end 62 of the slider member 18. The core element 12 therefore extends through the spring 66. The core element 12 includes a slug 76 for transmitting forces from the core element 12 to the slider member 18. During installation, the core element 12 is placed in tension whereby the slug acts against the end of the slider 18 to compress the spring 66. The slider 18 slides against the spring 66 to an equilibrium position whereupon the locking button 34, 134 is moved from the unlocked to the locked position to prevent further relative longitudinal movement between the slider 18 and the housing 22, 122.

The housing 122 of the second embodiment includes a platform 180 extending from the bottom 26 of one end 32 and connected to that end 32 of the housing 122 by triangular gussets 182.

The invention has been described in an illustrative manner, and it is to be understood that the terminology which has been used is intended to be in the nature of words of description rather than of limitation.

Obviously, many modifications are variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly for transmitting motion in a curved path comprising:

a flexible motion transmitting core element (12);

a conduit (14) movably supporting said core element (12);

a slider member (18) having a longitudinal axis and attached to one end of said core element (12) and having an exterior presenting slider teeth (20);

a housing (22, 122) slidably supporting said slider member (18) for movement along said longitudinal axis;

said housing (22, 122) having a bottom (26) and an opening extending upwardly from said bottom (26) and surrounded by sides (28) presenting interior surfaces and parallel to said longitudinal axis and a first end (30) and a second end (32) extending transversely to said longitudinal axis;

a locking button (34, 134) supported by said housing (22, 122) for moving between an unlocked position in which said slider member (18) may slide freely relative to said housing (22, 122) and a locked position in which said slider member (18) is prevented from sliding relative to said housing (22, 122);

said locking button (34, 134) being U-shaped to define legs having insides presenting button teeth (36) for engaging said slider teeth (20) in said locked position;

said locking button (34, 134) including release tabs (38, 40) engaging said first and second ends (30, 32) of said opening in said housing (34, 134) for retaining said locking button (34, 134) in said locked position in said housing (22, 122) and for moving independently of said button teeth (36) in a direction parallel to said long, tailored axis to release said locking button (34, 134) from said locked position in said housing (22, 122) in response to forces applied thereto in a direction parallel to said longitudinal axis.

2. An assembly as set forth in claim 1 including a tongue (56) and groove (59) for mechanically interlocking each of said tabs (38, 40) and said housing (22, 122) in said locked position, each tongue (56) and groove (59) extending transversely to said longitudinal axis.

3. An assembly as set forth in claim 2 including catches (54, 154, 155) on said interior surfaces of said sides (28) of said housing (22, 122) for preventing said locking button (34, 134) from being removed from said housing (22, 122) in said unlocked position.

4. An assembly as set forth in claim 3 wherein said locking button (34, 134) includes a central body (42) having lateral surfaces (44) for engaging said interior surfaces of said sides (28) of said housing (22) and a top (46) extending between said lateral surfaces (44), said central body (42) having U-shaped end surfaces (48, 148) extending transversely to said longitudinal axis and intersecting said lateral surfaces (44) and said top (46), a channel (50, 150, 151) in each of said lateral surfaces (44) extending from said top (46) downwardly to a step (52), each catch (54, 154, 155) includes a wedge surface for riding over said step (52) and into said channel (,50, 150, 151) in said adjacent lateral surface (44) for retaining said locking button (34, 134) to said housing (22, 122) during movement between said locked and unlocked positions.

5. An assembly as set forth in claim 4 wherein said channels (150, 151) are of different widths and said catches (154, 155) are of different widths to pair with said channels (150, 151) to allow only one way insertion of said locking button (34) into said housing (22).

6. An assembly as set forth in claim 4 wherein each of said sides (28) includes facing guide surfaces (129) extending transversely to said longitudinal axis and slidingly engaging said end surfaces (148) of said central body (42) for guiding vertical movement of said locking button (134) relative to said housing (122).

7. An assembly as set forth in claim 6 wherein said end surfaces (148) of said central body (42) extend laterally into said guide surfaces (129) a greater distance than the lateral extent of said tab legs (38).

8. An assembly as set forth in claim 4 wherein each of said tabs (38, 40) includes a pair of tab legs (38) and a shelf (40), said tab legs (38) being spaced from said adjacent end surface (48, 148) of central body (42) and connected to said central body (42) at said lower ends thereof, each shelf (40) interconnecting said upper ends of said tab legs (38) and extending longitudinally in opposite directions away from said central body (42).

9. An assembly as set forth in claim 8 wherein each of said tongues is defined by a cross beam (56) extending between said sides (28) of said housing (22, 122) in spaced relationship to said bottom (26) to define an opening for receiving said slider member (18), said first and second ends (30, 32) of said housing include a ramp (58) disposed on each tab leg (38) in spaced relationship to said shelf (40) to define said grooves and for ramping over each of said cross beams (56) whereby each of said cross beams (56) is disposed in one of said grooves in said locked position.

10. An assembly as set forth in claim 9 wherein said shelves (40) extend longitudinally over said cross beams (56) in said looked position whereby said shelves (40) may be manually grasped and forced together toward said end surfaces (48) to clear said ramps (58) from said cross beams (56) to remove said locking button (34) from said locked position to said unlocked position.

11. An assembly as set forth in claim 10 including a spring abutment (60) disposed in said opening at said second end (32), said slider member (18) includes a passage extending between a closed end (62) and an open end (64), said spring abutment (60) being disposed in said passage for sliding movement of said slider member (18) over said spring abutment (60), a spring (66) disposed in said passage and reacting between side closed end (62) and said spring abutment (60) to urge said slider member (18) out of said first end (30) of said housing (22, 122).

12. An assembly as set forth in claim 11 including a pair of hooks (68) disposed on said opposite sides of said slider member (18) and extending through said opening in said second end (32) to hook onto said second end (32) to prevent said slider member (18) from moving out of said housing (22, 122) in a shipping condition, said hooks (68) being disposed under said locking button (34, 134) in said shipping condition to prevent said locking button (34, 134) from being moved to said locked position until said slider member (18) is moved from said shipping position against said force of said spring (66).

13. An assembly as set forth in claim 12 including a pair of latches (70) disposed at opposite sides of said opening in said second end (32) for forcing said hooks (68) together as said slider member (18) is initially coupled with said housing (22, 122) and said hooks (68) snap over said latches (70) and into mechanical interlocking engagement therewith.

14. An assembly as set forth in claim 13 wherein said shelves (40) and said top (46) of said locking button (34, 134) are in said same plane in said locked position.

15. An assembly as set forth in claim 14 wherein said cross beams (56) are below said upper extremities of said sides (28) of said housing (22, 122) and said upper extremities of said sides (28) are also in said same plane with said shelves (40) and said top (46) in said locked position.

16. An assembly as set forth in claim 15 wherein said bottom (26) has guides (72) extending longitudinally from said first end (30) to said second end (32), said slider member (18) including longitudinally extending rails (74) disposed in said guides (72).

17. An assembly as set forth in claim 16 wherein said core element (12) extends through said spring abutment (60) and said passage of said slider member (18) and through said closed end (62) of said slider member (18), said core element (12) including a slug (76) for transmitting forces from said core element (12) to said slider member(18).

18. An assembly as set forth in claim 17 wherein said core element (12) extends through said spring (66).

19. An assembly as set forth in claim 18 wherein said housing (22, 122) includes a connection means (24) for connecting said housing to a control member.

20. An assembly as set forth in claim 19 wherein said connection (24) includes a "C" shaped clip disposed on one side of said housing (22, 122).

* * * * *